(12) United States Patent
Montemayor et al.

(10) Patent No.: US 7,113,915 B1
(45) Date of Patent: Sep. 26, 2006

(54) SYSTEM FOR SCHEDULING AND MONITORING A PROJECT

(76) Inventors: Susanne Montemayor, 6106 Springer Way, San Jose, CA (US) 95126; Robert Samuel Smith, 1263 Emory St., San Jose, CA (US) 95126

( * ) Notice: Subject to any disclaimer, the term of this patent is extended or adjusted under 35 U.S.C. 154(b) by 0 days.

(21) Appl. No.: 10/982,599

(22) Filed: Nov. 5, 2004

Related U.S. Application Data

(60) Provisional application No. 60/560,856, filed on Apr. 9, 2004.

(51) Int. Cl.
*G06Q 99/00* (2006.01)
(52) U.S. Cl. .......................................... 705/8
(58) Field of Classification Search ................ 705/8
See application file for complete search history.

(56) References Cited

U.S. PATENT DOCUMENTS

| | | | | |
|---|---|---|---|---|
| 5,918,219 A | * | 6/1999 | Isherwood | 705/37 |
| 2002/0082883 A1 | * | 6/2002 | Hankinson | 705/7 |
| 2002/0087381 A1 | * | 7/2002 | Freeman et al. | 705/9 |
| 2003/0069716 A1 | * | 4/2003 | Martinez | 702/188 |
| 2004/0030992 A1 | * | 2/2004 | Moisa et al. | 715/513 |

FOREIGN PATENT DOCUMENTS

| | | | |
|---|---|---|---|
| JP | 07-049910 A | * | 2/1995 |
| JP | 09-261619 A | * | 10/1997 |

OTHER PUBLICATIONS

Shih et al. "A Preliminary Application of Panoramic Supervision System in Construction Site." Information Visualization, 2001. Proceedings. Fifth International Conference on Jul. 25-27, 2001, pp. 103-108.*

Jennings, K. Denise. "Webcams for Contractors." Construction Executive, pp. 32-34, Jun. 2003.*

Retik et al. "Mobile Hybrid Virtual Reality and Telepresence for Planning and Monitoring of Engineering Projects." Department of Civil Engineering. University of Strathclyde, Glasgow, retr.from [URL: http://www.ee.surrey.ac.uk/Personal/R.Bowden..] Oct. 28, 2005.*

"Competitive Advantage: Project 98." Businessworld, Jan. 27, 1998.*

"Gantt chart—a searchCIO definition" web site [URL:http://web.archive.org/web/20030713134550/http://searchcio.techtarget.com/s Definition/0,,sid19_gci33139...], last updated on Apr. 30, 2003.*

* cited by examiner

*Primary Examiner*—Susanna M. Diaz
(74) *Attorney, Agent, or Firm*—Robert Samuel Smith

(57) ABSTRACT

A system for managing a project being a plurality of jobs including construction jobs wherein some of the jobs don't require completion of other jobs and remaining jobs require completion of at least one of the independent jobs and/or completion of other jobs in the plurality of jobs. The system separates jobs into lists according to their dependency on other jobs and assigns manpower according to expense, expressed as man days, for completing the job withoin a list period. The system is preferably implemented in conjunction with a panoramic camera and computer. One section of the computer screen displays a 360° field of view of the project. Another section displays a table showing the interrelationship of the jobs. Alpha-numeric indicia, entered by a mouse/keyboard at job locations on the image section of the screen are indexed to jobs scheduled in the table which is entered in the text section of the screen.

8 Claims, 12 Drawing Sheets

MONITORING PROGRAM

| 14. CREATE "UPDATE" TABLE DUPLICATE OF "SCHEDULE" TABLE EXCEPT SUBSTITUTE "ACTUAL" TIMES FOR "ESTIMATED" TIMES OF SCHEDULE TABLE WHEN AVAILABLE |
|---|

↓

| 15. CREATE BAR CHART OF "SCHEDULE" TABLE |
|---|

↓

| 16. CREATE "UPDATE" BAR CHART FROM "UPDATE" TABLE, INTERLEAVE "UPDATE" AND "SCHEDULE" BAR CHARTS. |
|---|

↓

| 17. TAKE PICTURE OF PROJECT SITE AND INCLUDE DATE DATA |
|---|

↓

| 18. RECORD TIME OF PICTURE WITH PICTURE |
|---|

↓

| 19. STORE PICTURE WITH BAR CHART DATA |
|---|

↓

| 20. PROJECT BAR DATA ON SCREEN WITH VERTICAL TIME LINE INDICATING PICTURE TIME |
|---|

↓

| 21. ENTER INDICIA SIGNIFYING LOCATION OF JOBS ONTO IMAGE FROM KEYBOARD |
|---|

↓

| 22. NORMALIZE TIME TO "MAN DAYS" |
|---|

FIG. 4C

| | I | II | III | IV | V | VI | VII | VIII | | | |
|---|---|---|---|---|---|---|---|---|---|---|---|
| | TOTAL JOBS | AVAIL. RES | EXPENSE (TIME) | REQUIRED PRIOR JOBS | START TIME | FINISH TIME | INDEPENDENT JOB LIST | NEXT JOB LIST | LAST JOB LIST | LOCATION X | Y |
| | A | | 1 | | 0 | 1 | A | | | 2 | 5 |
| | B | | 4 | A,D | 5 | 9 | | B | | 3 | 10 |
| | C | | 6 | BE | 9 | 15 | | | C | 7 | 2 |
| | D | | 5 | | 0 | 5 | D | | | 3 | 4 |
| | E | | 3 | | 0 | 3 | E | | | 9 | 9 |
| | F | | 2 | KDA | 5 | 5+2 | | | F | 9 | 1 |
| | G | | 3 | A,L | 5 | 5+3 | | G | | 7 | 2 |
| | H | | 2 | ACF | 0 | 2 | H | | | 2 | 7 |
| | J | | 4 | AB | 9 | 13 | | | J | 3 | 3 |
| | K | | 2 | ACF | 6 | 8 | | K | | 8 | 6 |
| | L | | 5 | K | 8 | 13 | | L | | 3 | 10 |
| | M | | 7 | BD | 5 | 12 | | M | | 9 | 4 |

FIG. 5

| I | II | III | IV | V | VI | VII | VIII | | | |
|---|---|---|---|---|---|---|---|---|---|---|
| TOTAL JOBS | REQ. MEN | EXPENSE (MAN DAYS) | REQUIRED PRIOR JOBS | START DAYS | FINISH DAYS | INDEPENDENT JOB LIST | NEXT JOB LIST | LAST JOB LIST | LOCATION X | Y |
| A | 2.2 | 2 |  | 0 | 0.9 | A |  |  | 2 | 5 |
| B | 3.7 | 4 | A,D | 0.9 | 2 |  | B |  | 3 | 4 |
| C | 10 | 6 | BE | 2 | 6 |  |  | C | 7 | 2 |
| D | 6.6 | 6 |  | 0 | 0.9 | D |  |  | 3 | 4 |
| E | 6.6 | 6 |  | 0 | 0.9 | E |  |  | 9 | 9 |
| F | 6.6 | 2 | KDA | 2 | 6 |  |  | F | 9 | 1 |
| G | 2.7 | 3 | A,L | 0.9 | 6 |  |  | G | 7 | 2 |
| H | 4.4 | 4 |  | 0 | 0.9 | H |  |  | 2 | 7 |
| J | 6.6 | 4 | AB | 2 | 6 |  |  | J | 3 | 3 |
| K | 3.7 | 2 | A | 2 | 6 |  |  | K | 8 | 6 |
| L | 4.5 | 5 | K | 2 | 6 |  |  | L | 3 | 10 |
| M | 5.5 | 6 | BD | 0.9 | 2 |  | M |  | 9 | 4 |

START (DAY): = 0    FINISH (DAY): = 2.6

MEN: 20    EXPENSE (MAN DAYS) = 52

FIG. 7

Appln. No. 10/982,599
Replacement Sheet

SET M = number of available men

COMPUTE remaining expense and assignment of men to each job during period, $D_{N-1}$ to $D_N$, by successive substitution into:

$S_N = S_{N-1} - M(D_N - D_{N-1}) + j_N$ (beginning with $S_0 = a + b + c +$ ($S_N$ is the total expense required to complete the jobs in progress at the beginning of period N.)

$M_N^X = MX_N / (S_N + j_N)$ beginning with $M_0^X = MX_0 / S_0$ $M_N^{AX}$ = men assigned to job X at $D_N$ $X_N = X_{N-1} - M_{N-1}^X (D_N - D_{N-1})$ (beginning with $X_0 = X$)

$X_N$ is the expense (in man days) required to finish job X at the start of period N.

FIG. 10

SYSTEM FOR SCHEDULING AND MONITORING A PROJECT

CROSS REFERENCE TO PRIOR APPLICATIONS

This application is a non provisional application of provisional application 60/560,856 filed Apr. 9, 2004 from which priority is claimed

FIELD OF THE INVENTION

This invention relates to scheduling a project and particularly a construction project including time date panoramic photographs to check status.

BACKGROUND AND INFORMATION DISCLOSURE

An important problem in preventing over-runs of expense during projects such as a building project is to monitor the progress of the project and relating the progress to a schedule of events. In the case where the project is a building project, such events include ordering and delivery of material, hiring of subcontractors, allowance of easements, payment related to construction status, etc.

Each of these activities are typically the subject of sub-contracts whose fulfillment must be completed according to schedule in order that the entire project proceed on time.

Violations of contract agreements are sometimes the subject of litigation. Proof of these violations are generally the basis for winning favorable judgement. Establishing proof is often difficult because of the difficulty in establishing the timeliness of events.

Software programs, such as "Microsoft Project" and "Primavera" have been on the market for many years as an aid to developing a schedule for developing a project which includes a number of jobs. These projects are based on "critical path analysis" to produce a "gant chart" followed by assigning resources (men and equipment) to the project in order to meet the schedule.

Monitoring the progress of a project is often complicated by the fact that the most deeply committed parties in the project cannot be constant overseers because their concerns must be divided among a number of such projects. For example, an investor in a project in one country may be a resident in another distant country. Furthermore, investors are not usually experts on reading gant charts. The opportunity to have first hand knowledge of progress in a building program can sometimes be an inducement to a foreign investor to "take the plunge" into otherwise uncertain investment waters. A system that integrates pictorial information of the project site with projections and status reports in a simplified presentation would be a enthusiastically received in the investment community.

There are numerous constraints imposed on the process of scheduling time, materials and manpower for completing a project such as a large building project.

One of these constraints is that the project consists of numerous jobs that require a variety of skills for completion.

Another constraint is the release of funds based on the completion of distinct phases of the work.

Another constraint is that funds are released to finance a job traditionally after certain phases of the project are complete. Therefore the hiring of men and purchase of material must be planned with this constraint in force.

Another constraint is that many of the start of many jobs of a project depend on the completion of combinations of other jobs. This greatly complicates the requirement to schedule the right kind of workmen and delivery of material to support the project.

SUMMARY OF THE INVENTION

It is an object of this invention to provide a system for scheduling and monitoring a project that can be regarded as a series of interrelated jobs.

This object requires that the interdependencies of the jobs, the judicious assignment of men having any one of variety of skills, the availability of funds during various phases of the project be taken into account, the time constraints on each of these phases be taken into account in developing a schedule for executing the project.

It is a further objective that the schedule list of assignments of resources (manpower) be assigned according to an algorithm that minimizes the time required to complete the project.

It is a further object to produce corroborating irrefutable evidence of project status including pictorial evidence that correlates to document evidence.

This invention is directed toward a system including a camera, a computer, a keyboard, a screen monitor. The computer is programmed to apply an algorithm of this invention to compose a schedule that is responsive to the constraints imposed on the project.

A preferred camera is a panoramic camera having the capability to view a 360° field of view surrounding the camera so that dated pictorial evidence is generated that supports documentary evidence. The panoramic camera has a lens system including a hemispherical dome and a concave mirror that reflects the field of view onto the photodiode array of a digital camera inside the dome. The image signal from the camera representing the image of the 360° field of view is stored in the image memory for presentation on the screen.

Progress on the project is recorded by the camera showing the state of completion and a time stamp that enables an examiner to relate actual state of the project to the schedule.

The computer is programmed to enter data input by a keyboard into a table format and present the table and dated image on the screen.

The combination of the camera technique to monitor work progress in comparison to a schedule is applied to two situations.

In the first situation, where manpower is applied on a more "as needed" basis and the requirement of fore casting a "completion" date is less stringent, a table is composed in which:

a first column lists all jobs that make up the entire project:

a second column lists the period of time estimated to complete the project;

a series of following columns are added in which the "lowest order" column lists all "independent" jobs which do not require that any other jobs be complete before starting the independent jobs and in successive "next" columns are listed jobs that require completion of any jobs in the previous columns;

a starting time column determined from data of the other columns;

a finish time column determined from analysis of the other columns.

Another situation is where there is required a closer control over carefully allotted resources.

According to this method, a table is created by entering the data into an algorithm of this invention which computes the most efficient order for performing the jobs, the composition of the work force required for each job during the time period for executing the job, correction of the schedule in response to unforeseen delays.

The project is thereby divided into natural periods, wherein one list of jobs is executed during each period. This distribution of jobs overcomes a major scheduling problem which is to determine when to execute any one job in relation to the other jobs.

The division of the project into periods is a natural way for timing the release of funds periodically throughout the project as is the usual practice. Release of funds normally determines the amount of manpower that is available during any one period.

According to a second application of the algorithm, the proportion of Manpower that is assigned to any one job during the period depends on the "expense" of the job relative to the total expense of all of the jobs executed during the period. Expense is expressed as the man-days required to execute the job.

This proportioning of manpower provides two advantages.

One advantage is that all of the jobs in any one period will start at the beginning of the period and will end at the end of the period. This greatly simplifies evaluation of the state of the project during the period and at the end of the period.

Another advantage is that a determination of the composition of the workforce during the period is conveniently determined (e.g. how many carpenters, plumbers, etc.) This arrangement also provides a desired result that a body of workman having one skill is conveniently and continuously employed during the next period because one period starts when another period ends.

Another advantage is that the method minimizes the time required to complete the entire project.

In practicing the method, several documents are formed according to a program stored in the processor.

The first document is a "schedule" table in which a first column is a total list of jobs.

In the second column, the estimated "expense" is listed as "man-days" required to perform the job.

For example, if five men require three days to perform the job of digging a ditch, then the "expense" is 5×3=15 man days.

The following columns is a series of "next job" columns. "Each" job in any one of the "next job" columns requires that one or more certain jobs in the previous columns be complete before the job in the said "each" job can be performed beginning with a first column which lists all jobs that do not require any other jobs to b completed in order to start the job.

The algorithm applied when manpower is fixed during any one period is— if M is the total number of men available; and if x,y,z—is the number of man days required to complete jobs X,Y,Z—respectively listed in the current "next job" list, then the total number of man days required to complete all of the jobs in the "next job" list is T where T=x+y+z— and the number of men assigned to each of jobs X, Y, Z,—is Mx/T, My/T, Mz/T—respectively. All of the jobs X,Y,Z—in the "next job" list are started and completed in the same period of time, t, where $t=T/M$ After the series of "next fob" columns, the following column will be a list of the start dates of each job.

The following column will be the list of finish dates of each job.

In some cases within any "next job list period" it may be impractical to assign man power to some jobs in proportion to the "expense" (in man days) for performing the job.

For example, if a job of pouring concrete requires three days (to include the time for curing the concrete), then there is no way that the time for performing the job can be shortened or lengthened by assigning more or less men to the job. This can result in "spare time" for the men assigned to this job. The rule of thumb for this situation is to assign these men having "spare time" to other jobs on the current "next job" list in proportion to the man days (x, y, or z) required to do the job in order that all of the jobs on the "next job" list be finished at one time.

In another set of situations, it may be impossible or impractical to start every job in a list at the start of the respective period. In this event, the algorithm is applied to assign to each ongoing job, at the start of the delayed job, that proportion of the total manpower which equals the proportion of the expense required to finish the job to the total expense required to finish the ongoing jobs.

The second document is a duplicate of the first (schedule) table except that the computer is programmed to accept "updated" data and modify the second (updated) table as the project progresses.

The third document is a bar chart of horizontal bars where the jobs are listed along the vertical coordinate. Time is measured along the horizontal coordinate.

In the situation where the resources are fixed, distance along the horizontal coordinate is directly proportional to the total man-days expended on the project.

The bar chart is formed by interleaving two sets of horizontal bars.

In the case of resources available as needed, one set of bars represents the "start" and "finish" time of each "scheduled job" as determined from the schedule table (first document). The second set of bars ("update" bars) represents the actual "start" and "finish" times as the project proceeds and is taken from the "update" table. Each time the project is updated with actual "start" and "finish" times, all of the "start" and "finish" times in the updated table are recalculated to reflect the modifications.

Because the two sets of bars are interleaved, the "schedule" bar of each job is parallel adjacent to the "update" bar so that the viewer can determine at a glance what the actual status of each job is relative to the schedule.

According to the method of the invention, a series of pictures (preferably panoramic) is taken of the project site during the course of the project. Each picture has a time stamp (date) imprinted as part of the image data.

In one format, the 360° field of view is presented on the screen as a "doughnut" where the radial coordinate of the doughnut corresponds to the elevational angle in the field of view and the polar coordinate of the doughnut corresponds to the longitudinal angle of the field of view.

When the image data is entered into the computer for presentation on the screen, a vertical "time" line is generated in the bar chart whose intersection with the horizontal coordinate represents the instant when the picture was taken. The vertical line is generated by a time signal that is part of the image signal that was recorded when the picture was taken.

An examiner of the documents and image can thereby sense the state of completion of each job by where the "time" line intersects the respective job bar on the screen.

The interleaved update and schedule bars provide that an examiner can determine at a glance the status of the individual jobs and can reallocate resources on an almost daily basis as required to maintain the schedule.

An important feature of the camera of this invention is that when the user requires to capture "close up" image data where great detail of a small area is required, then the operator can rotate the reflecting mirror out of range of the image forming region in front of the camera so that the image of a field of view close to the camera is presented to the screen. This detailed image data is then storable in the memory.

Such "close-up" image data can include documents that are germane to the image stored in the image memory.

For example, if a certain amount of material is scheduled for delivery on a particular day, then a record of the delivery would be an image (picture) of a truck rolling up to make the delivery. The image of the truck is captured by the camera. Then the camera is changed to the "close up" mode by rotating the reflecting mirror away from in front of the camera and a close up picture of the delivery slip (or purchase order, etc.) is taken by the camera and assigned to the text memory. What the user sees is an image of the 360° field of view (showing the delivery truck) in one area of the screen and an image of the paper work in another area of the screen.

In another embodiment, the panoramic camera is mounted on the top of a steeple. A conventional camera having a directional field of view is mounted on the steeple under the panoramic camera. The camera is rotationally mounted on the steeple such that the direction of the field of view is controlled by the operator rotating the camera around the steeple to the direction of interest. The operator is located at a location remote from the steeple.

This method of operation saves the operator considerable effort in generating a written description of the days events.

The operator can also use the keyboard to enter text data to accompany the image data so that the ultimate viewer is provided with a very complete picture of the days events on the project. According to this mode, the viewer, looking at the image, operates the mouse to move the cursor to each location where a job is supposed to take place. He then "marks the location on the image by using the keyboard to "print" a character (e.g., a letter) which is listed with the job in the table.

BRIEF DESCRIPTION OF THE DRAWINGS

FIG. 5 shows the table for determining estimated start and finish times for the "resources available as needed" mode.

FIG. 7 shows the table where expense, start, finish are expressed as man-days

FIG. 10 is a flow chart to reassign men to compensate for late starts.

DESCRIPTION OF A BEST MODE

Figure 1:
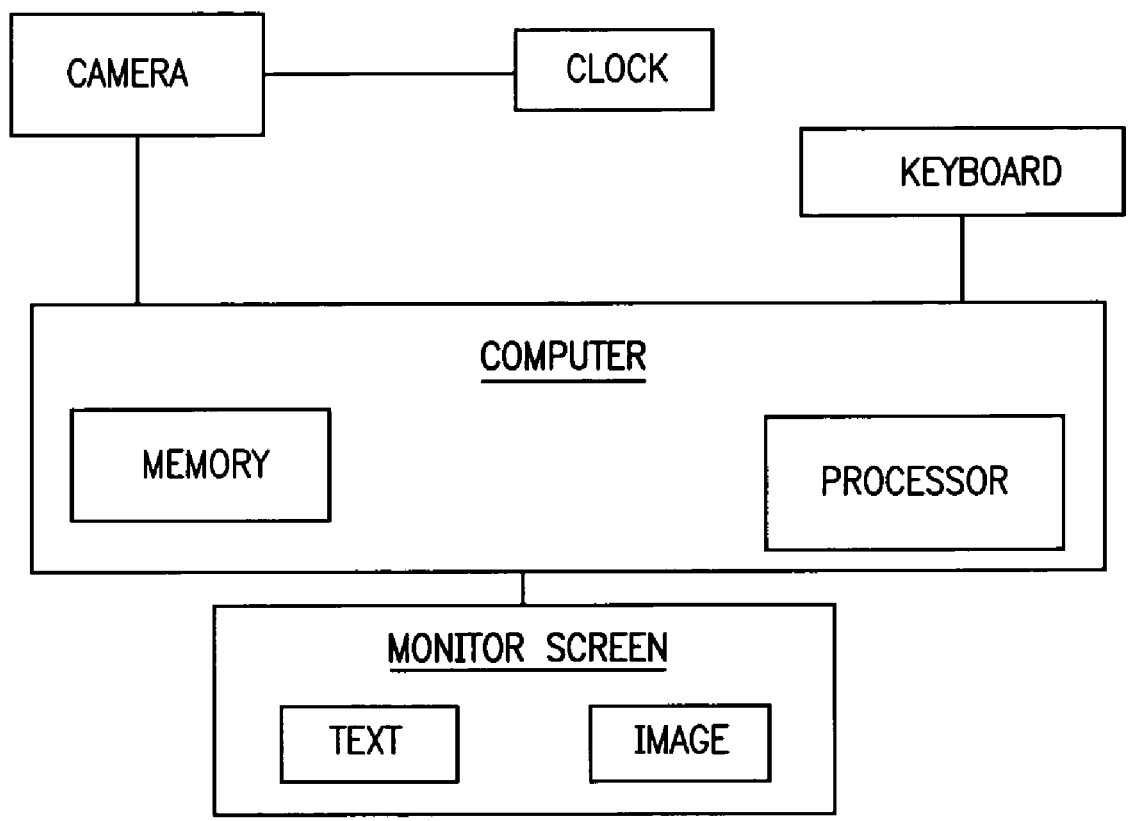
FIG. 1 shows the system of this invention for documenting project progress.

Turning now to a discussion of the drawings, FIG. 1 shows the system 10 of this invention for documenting progress of a project. There are shown a camera 12, a keyboard 14, a text memory 16, an image memory 18, a processor 20, a clock 22, a monitor screen 24 and a mouse 26 for operating a cursor on the monitor screen 28.

The camera is preferably a panoramic camera having a 360° field of view. FIGS. 2 A,B, illustrate the formats in presenting the image of the field of view the screen.

Figure 2A:
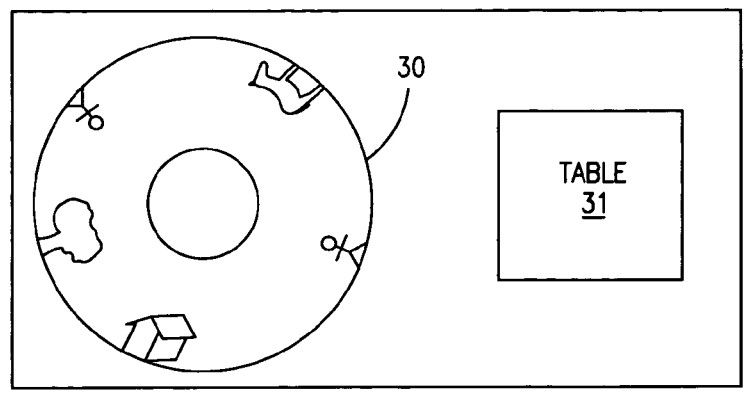
FIG. 2A shows a donut format for presenting the image of the field of view.
Figure 2B:
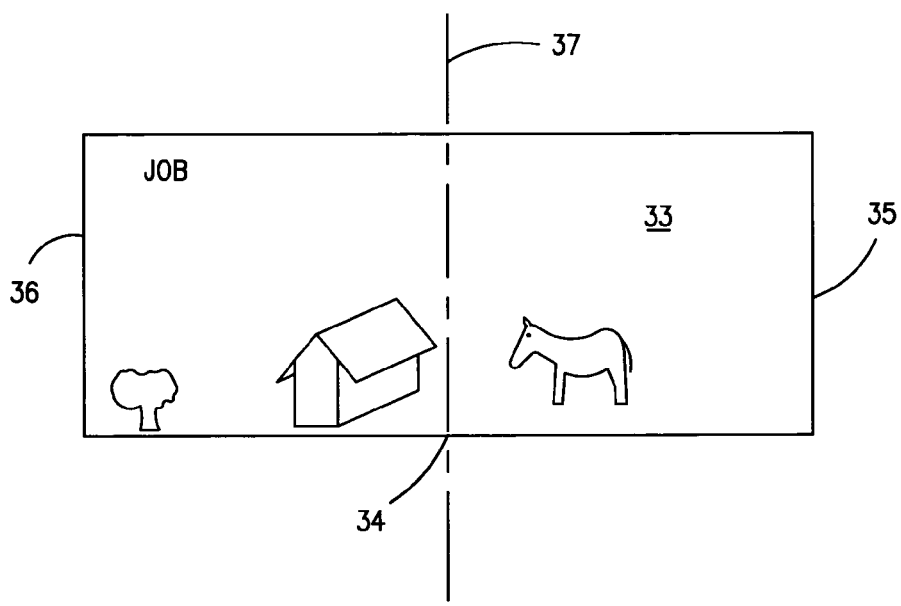
FIG. 2B shows a rectangle format for presenting an image of the field of view.

FIG. 2A shows one format, in which the image is a "doughnut" 30. The radial direction in the doughnut corresponds to the elevational angle of the field of view and the polar ordinate of the doughnut represents the longitudinal position in the field of view. The table 31 is also shown FIG. 2B shows another format, in which the image of the field of view is represented as a rectangular area 33. The horizontal ordinate 34 on the screen 35 represents the longitudinal coordinate in the field of view and the vertical coordinate 36 on the screen represents the latitudinal coordinate in the field of view.

The center 37 of the strip represents what an observer would see looking straight ahead at the field of view. The left and right edges of the strip represent what an observer would see as he rotates his head 180° in the left direction and right direction respectively.

Figure 3:
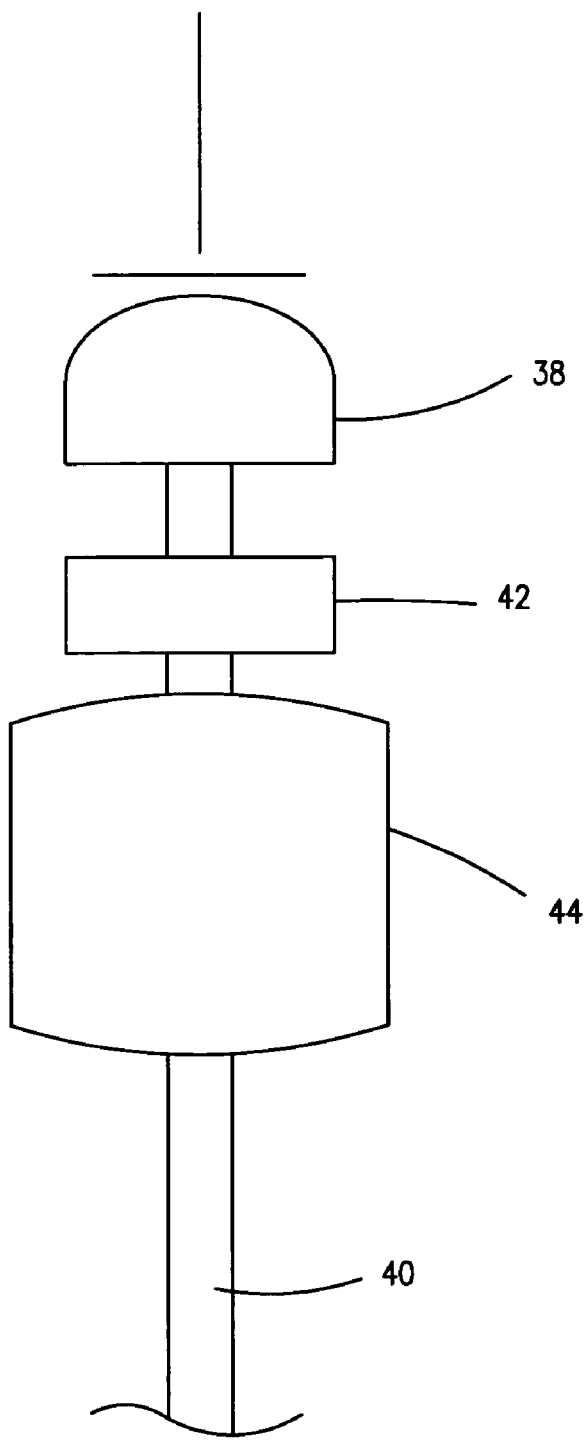
FIG. 3 shows a two camera system for improved study of the project site.

FIG. 3 is another embodiment for recording image data. The panoramic camera 38 is mounted on a steeple 40 wherein a centerline of the panoramic camera is in line with the steeple 40. A conventional camera 42 having a directional field of view is rotatably mounted on panoramic camera 38. The camera 42 is coupled to a motor 44. The direction of focus of camera 42 is controlled by an operator (not shown) energizing the motor 44 to rotate the camera 42 around the steeple 40 (centerline) to the direction of interest. The operator is located at a location remote from the cameras.

The mouse 26 with the computer (FIG. 1) is provided which enables the user to move a cursor on the screen to a location in the image showing where a job is to be executed (or has been executed) and then the user applies the key board to present, at the location, an alphanumeric character corresponding to an index of alphanumeric characters related to jobs of the project.

A clock is included in the camera enabling the time to be recorded automatically with the image. If the image is stored in computer memory then the time is also stored along with the image of the project.

The project is defined by a list of jobs where the jobs have to be completed in a certain order because of the interrelation between jobs. For example, a roof frame must be built (one job) before shingles can be attached (another job).

The processor is programmed (i) to transmit image data of the project site, from the camera to an image section of the monitor screen;

(ii) to generate and present on the screen, a table representing a project schedule using data entered from a keyboard;

(iii) to generate and present on the screen, a table representing a current status of the project using current data entered from a keyboard;

(iv) to display, on the screen, an interleaved bar chart diagram comparing scheduled completion times to actual progress in completing the jobs as corroborated by the image of the project site.

(v) to print, on the image, indicia representing a location where each of the jobs takes place that is listed in the text section. The indicia is entered by a mouse and keyboard in accordance with the invention.

(vi) to display, on the monitor screen, the date that the image of the field of view is recorded by the camera Three documents are generated in performing the method of this invention.

One document is a "schedule" table including a list of interdependent jobs with projected start and finish times comprising a schedule of the invention. Also included in the table is a list of resources required to perform the jobs and when the resources are available.

A second document is an "updated" table being a duplicate of the "schedule" except that the "update" table is updated by keyboard entries as jobs are rescheduled when required.

A third document is a chart comprising two sets of bars interleaved with one another. One set of bars represents the scheduled progression of jobs according to the "schedule" table. The second bar chart represents the "updated" status of the project.

At various selected times during execution of the project, an image of the project site is recorded by the 360° panoramic camera.

A clock is included in the camera enabling the time to be recorded automatically with the image. If the image is stored in computer memory then the time is also stored along with the image of the project.

Figure 4A:
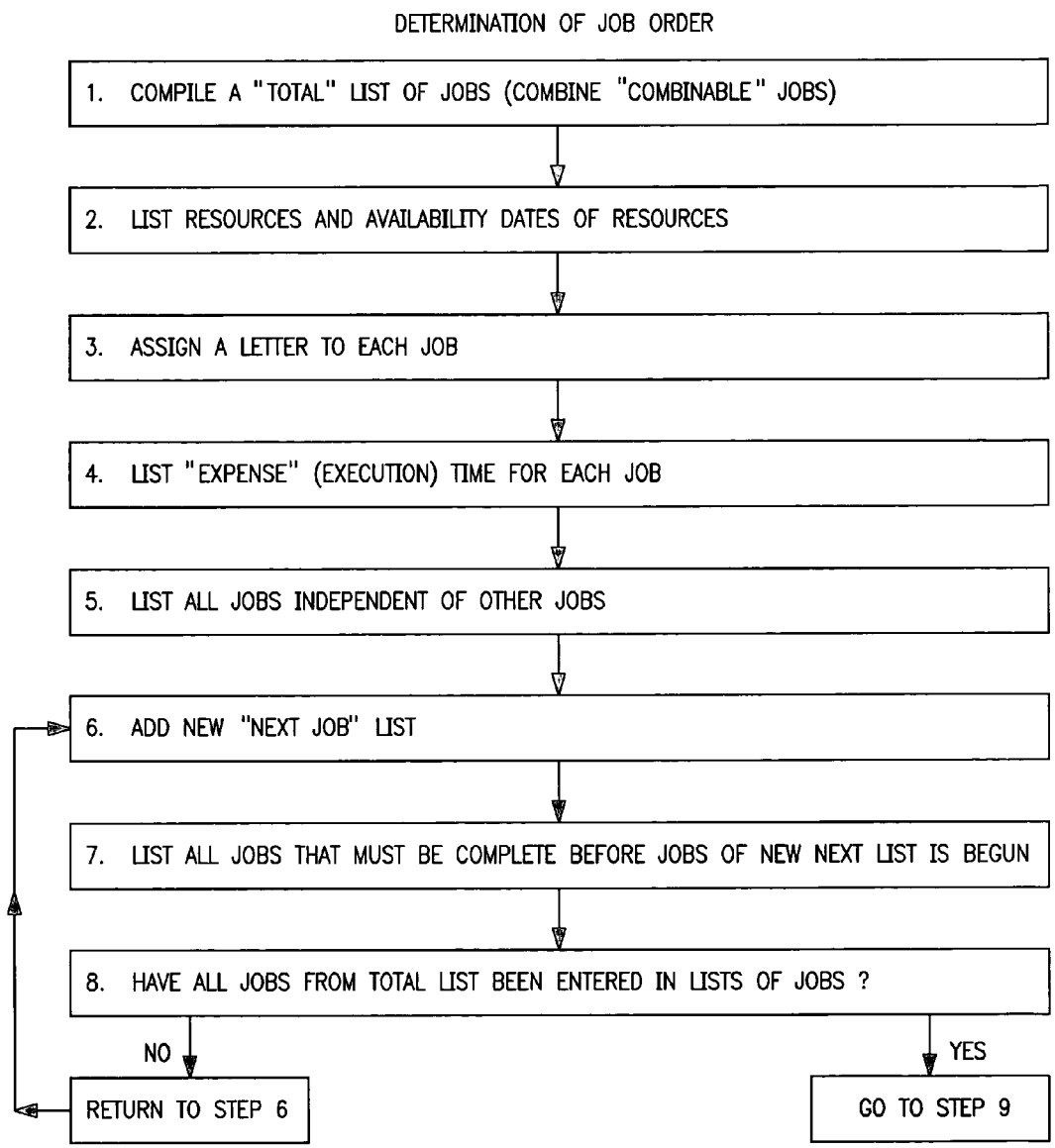
FIG. 4 is a flow chart of steps to generate the schedule and monitoring system
Figure 4B:
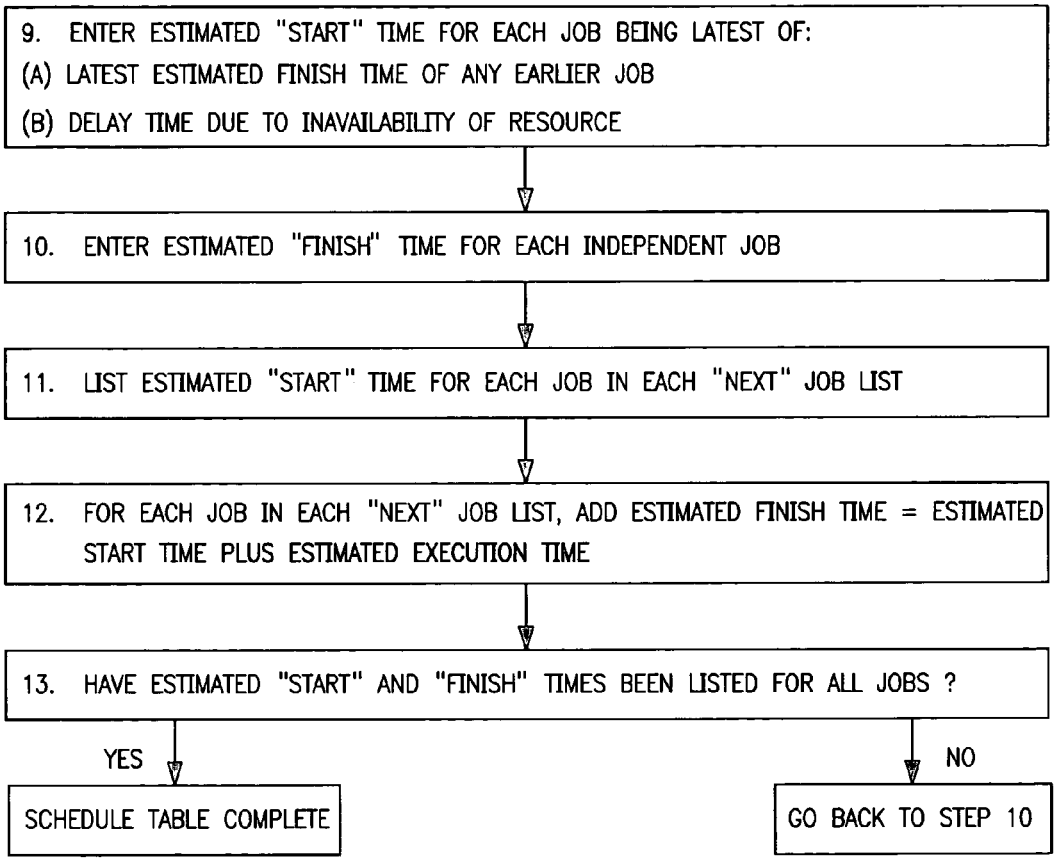

FIG. 4 is a flow chart of steps programmed in the computer for the case where resources to perform the jobs are available on an "as needed" basis.

FIG. 5 is a table generated according to steps 1–14 of FIG. 3.

Steps 1–8 are taken to establish the order for executing the total list of jobs.

Steps 9–13 are taken to compute the start and finish times of the respective jobs.

Steps 14–19 are directed toward constructing an "interleaved" bar chart that compares the schedule of steps 1–13 to actual completion of jobs in the project and is a vehicle for correcting the original estimated completion time.

The day of the start of the project is assigned a "start" date of "0". And all of the other times (start, completion etc.) of the individual jobs are relative to this "0" date.

In step 1, compile a TOTAL list of all jobs. The list is not shown in the table.

In step 1A, (optional) group jobs that are preferably done simultaneously. For example, if one job is pouring concrete for a basement and another job is pouring concrete for a pavement, the most economical procedure would be to list these two jobs as a combined job. Each combined job is regarded hereinafter as one job.

In step 2, (col. I) assign a letter to each job in the total list.

In step 3, (col. II) list available resources (men and equipment) and an "availability" time when the resources are available to work on the project The schedule is later modified in accordance with the restraints imposed by "availability data". Times presented in the documents are referenced to the time "0" which is the time when the project starts. (Only availability times are shown in col. II.

In step 4, (col. III), list an "EXPENSE" being the estimated length of time required to execute each job listed in the TOTAL list of jobs.

In step 5, (col. VII), select and list, from the TOTAL job list, all

"INDEPENDENT" jobs (i.e., jobs that do not depend on completion of other jobs). This list of independent jobs becomes the first list of a succession of "NEXT" lists of jobs.

In step 6, (col. VIII—) add a new "NEXT" list of jobs wherein each job of said new "NEXT" list of jobs is dependent on completion of jobs listed in all previous "NEXT" lists including the list of INDEPENDENT JOBS.

In step 7, (col. IV) for each job in col. XIII, list all jobs that must be completed before each job in the current "NEXT" job is begun In step 8, reply to: "Have all of the jobs from the TOTAL list of jobs been selected and become a part of anyone of the INDEPENDENT, and "NEXT" lists?

If answer is no, go to step 6. If answer is yes go to step 9.

Steps 1–8 is the group of steps that determine the order for executing the jobs This order is listed in col. V.

Steps 9–13 is the group of steps that determine and list the start and finish times of each job.

In step 9, (col. V) enter the estimated "START" time for each job. Estimated "start time" is the latest of:

The estimated latest finish time of any jobs that must be done before each job;

any delay time imposed by unavailability of resource;
    estimated" start" time is "0" for all independent jobs corrected by any delay of RESOURCE listed in col. 1B.

In step 10 (col. VI) enter estimated "FINISH" time for each independent job Estimated "FINISH" time is simply the estimated "START" time plus the "EXECUTION" time for the respective job listed in col. IV.

In step 11, have estimated "start" dates and estimated "finish" times been listed for all of the jobs?

YES PROGRAM IS ENDED NO GO BACK TO STEP 9

Steps 1–11 have created a table that represents the SCHEDULING PHASE of anticipated events leading to the completion of the project.

Steps 12–16 are executed to represent the MONITORING PHASE of the program

In step 12. Create an "update" table (not shown) which is a duplicate of the "schedule table" created by steps 1–11 except that the "actual" start and finish times for each job are substituted in the "update" table in place of the estimated times of the "schedule" table.

Figure 6:
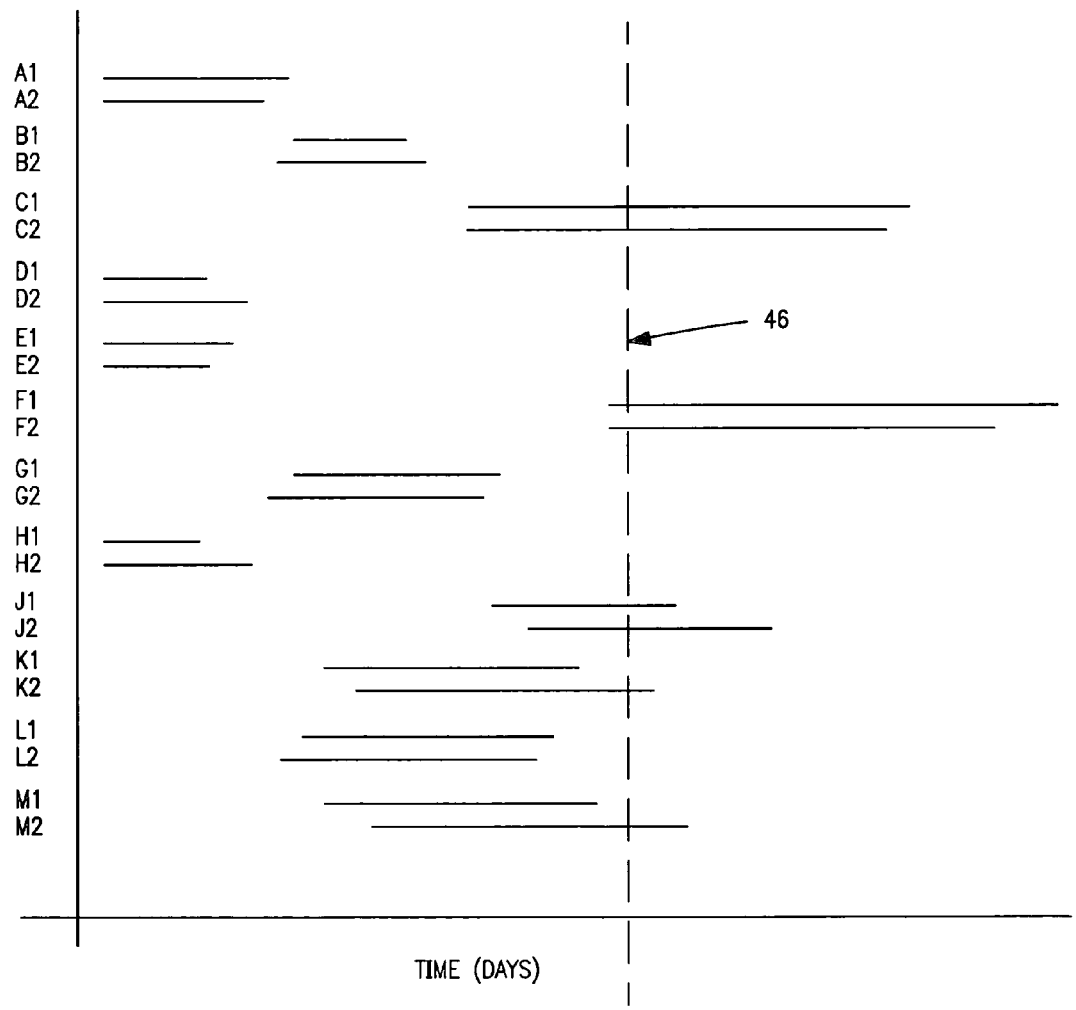
FIG. 6 shows an interleaved bar chart constructed from the data of FIG. 5.

In step 13, provide a bar chart (FIG. 6) in which all of the jobs are listed (as letters) along the ordinate. Time (days) is represented along the horizontal ordinate. TIME=0 marks the start of the project.

In step 14, for each job represented as a letter on the ordinate, draw a horizontal bar whose left end coincides with the estimated START date from col. V and whose right end coincides with the estimated FINISH date of col. VI. This bar array is a time representation of scheduled events and the bars of this array are designated A1, B1, C1, - - - .

In step 15, interleaved with bars A1, B1, C1, - - - , a second set of bars A2, B2, C2, - - - are added where the beginning of each bar of the second set corresponds to the "actual" start time listed in the second table of step 12. The actual finish times are listed from the second table of step 12.

In step 16, a series of "pictures" are taken of the job site as the project progresses. Each picture is selected at a "picture" time (selected at the discretion of the examiner), image data of the project site is recorded at the project site. The image is captured preferably with a 360° panoramic camera for presentation on screen In step 17, the "picture" time data is recorded with the image data of the panoramic field of view. The computer is programmed to present the "picture" time data as a vertical line 46 on the bar chart FIG. 6 that intersects the abscissa (bottom coordinate of the bar chart) indicating the time when the picture was taken relative to the status and schedule of the project. The Examiner is thereby able to learn at a glance the current status of each job (bars A1, B1, C1 - - - ) from where the bar is intersected by the vertical "time" line and how progress of each job compares to progress projected by the schedule (bars A2, B2, C2, - - - )

When the image (of the 360° field of view) is presented on the screen, a cursor and mouse is used to locate respective jobs and the keyboard is operated to print an alpha-numeric character on the screen. The locations of these indicia on the screen are stored in memory and each time the image is presented, the printed indicia reappears at the proper location thereby clearly identifying progress on the specific job.

FIG. 5 is the table generated related to the situation where resources are available on an "as needed" basis. The entries in the "Expense" column are the times estimated to perform the job. The estimator must "guess" how long it will take to perform the job when he may be uncertain as to how many men will be available for the job. Or, in other words, on any one day, the number of men required to maintain the schedule of work may be different from another day. Alternatively, he must be required to jostle his numbers from one day to the next without reliable guidance from the table as to how this is accomplished precisely.

FIG. 7 shows the data for determining distribution of manpower when available manpower is fixed. The "expense" is listed in col. IV in units of "man-days". This procedure is in contrast to the "expense" col. IV of FIG. 5 where "expense" is listed in units of time (days)

Figure 8:
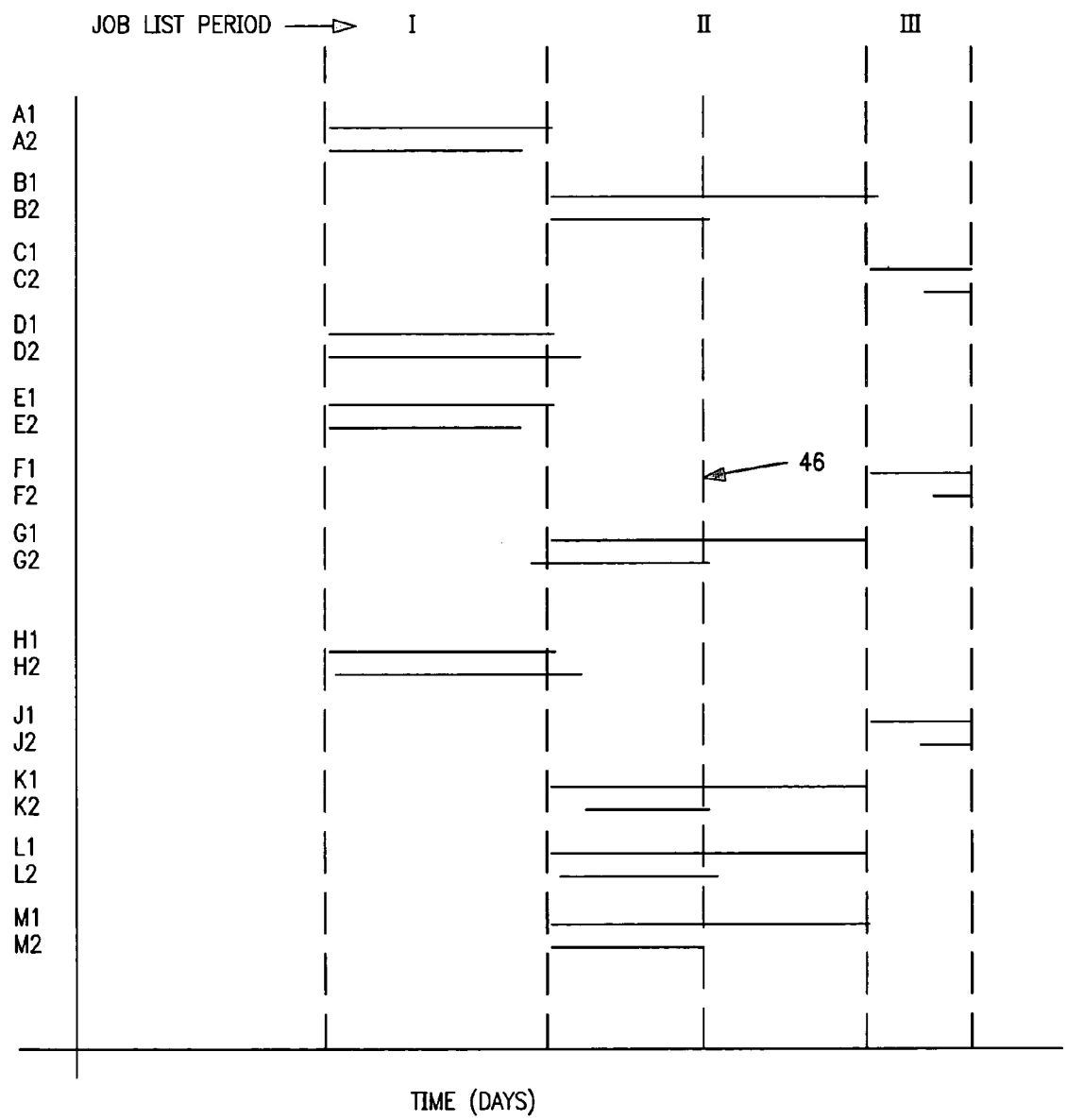
FIG. 8 shows the bar chart constructed from the data of FIG. 7.

FIG. 8 shows the bar chart constructed from the data of FIG. 7.

Two sets of interleaved bars are shown—the "schedule" bars (A1, B1, C1 - - - ) and the "update" (actual) bars—(A2. B2, C2, - - - ) The abscissa of the bar chart of FIG. 8 is expressed in units of time. The manpower is divided among each of the jobs in the current "next job" list column in proportion to the expense listed as "man-days in col. IV required to do said each job. Therefore, for all of the jobs in each "next job" list, the "start" times are simultaneous and the "finish" times are simultaneous.

This procedure minimizes the period of time required to perform the entire project. The situation is illustrated in the bar chart of FIG. 8 where all of the jobs of any list of jobs ideally start and stop at the same time (all have the same length).

As a further aid in evaluating progress of the project, the expense (expressed as "man-days", is written on each bar. Therefore, the supervisor can make immediate judgements in shifting manpower from one job to another if the latter job is lagging behind schedule.

The following algorithm of this invention is applied when manpower is fixed:

If M is the total number of men available; and if x,y,z - - - is the number of man days required to complete jobs X,Y,Z - - - then the total number of man-days required to complete all of the jobs in the "next job" list is T where T=x+y+z - - -

T is the total expense (man days) required to execute all of the jobs in the respective "next job" list.

The number of men assigned to each of jobs X, Y, Z, - - - is Mx/T, My/T, Mz/T—respectively. All of the jobs X,Y, Z - - - in the "next job" list are started and completed in the same period of time, t, where $$t=T/M$$

In some cases within any "next job list period" it may be impractical to assign man power to some jobs in proportion to the "expense" (in man days) for performing the job.

For example, if a job of pouring concrete requires three days (to include the time for curing the concrete), then there is no way that the time for performing the job can be shortened or lengthened by assigning more or less men to the job. This can result in "spare time" for the men assigned to this job. The rule of thumb for this situation is to assign these men having "spare time" to other jobs on the current "next job" list that appear to be lagging behind schedule or in proportion to the man days (x,y, or z) required to do the job in order that all of the jobs on the "next job" list be finished at one time.

In the general case for various reasons, the available manpower, M, may vary throughout the execution of the project. The system operates most efficiently when the manpower (number of men) is constant during any one "job list" period.

For example, the available manpower may be $M^I$, $M^{II}$, $M^{III}$—during "next job" list periods I, II, III,—respectively.

In this case, according to the practice of the invention, manpower assigned to any job, requiring $x_i$ man-days, of any "next list of jobs" is in proportion to the fraction $$M^I x_i/(\Sigma x_k) \; M^{II} x_i/(\Sigma x_k) \; M^{III} x_i/(\Sigma x_k)$$

according to the invention. The expression, $(\Sigma x_k)$, is the sum of the expense (in terms of man-days required to perform all of the jobs in the "next job" list. Assignment of manpower in accordance with this algorithm has the effect of minimizing the total time required to execute the entire project.

This algorithm is particularly effective in the case where the project is divided into time periods corresponding to the period required to execute the jobs in the respective "next job" list and funds available for each period are limited. This limit would therefore limit the manpower that could be hired during any "next job" period. The "make-up" of the manpower (e.g., carpenters, plumbers, etc.) would depend on the jobs in the next job list but the total number of Hirose would depend on the available funds.

Figure 9:
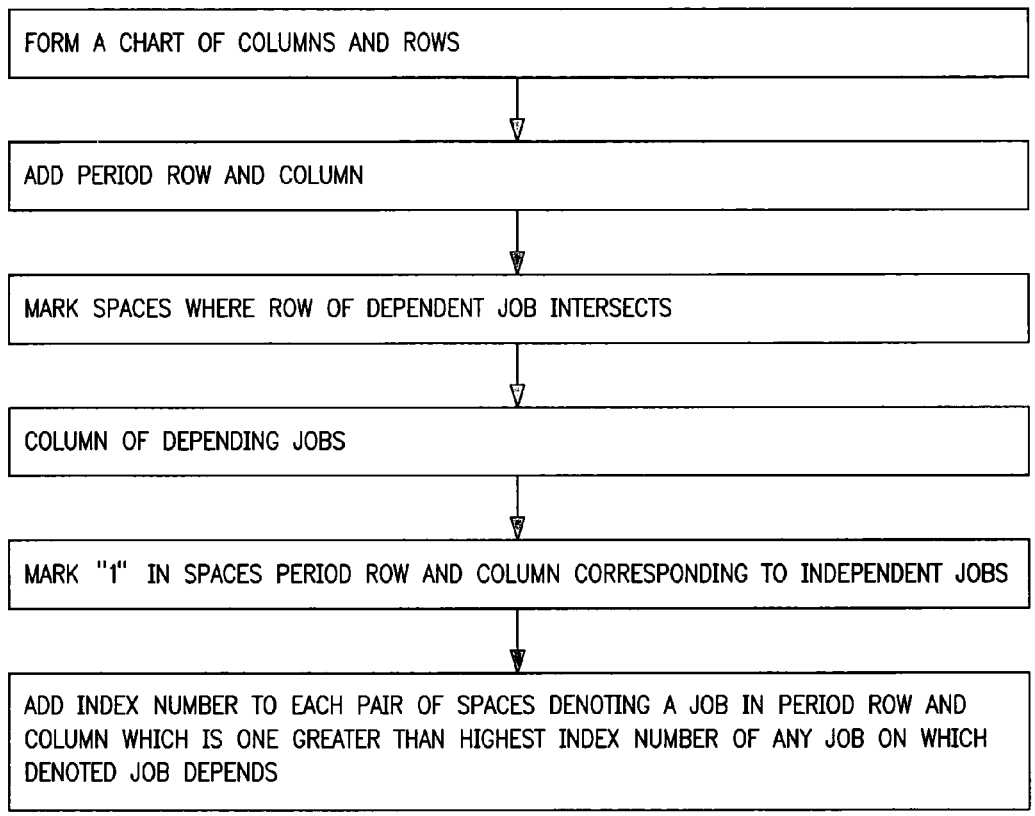
FIG. 9 is a flow chart of the method for assigning jobs to lists.

FIG. 9 is a flow chart listing steps for carrying out steps 5, 6, 7 of the flow chart of FIG. 4 which is a method of this invention for assigning each job of the total job list to the appropriate one of the "next list of jobs"

In step 1, form a chart of columns and rows listing the total list of jobs, $J_A$, $J_B$, $J_C$,—at the head of each column and at the beginning of each row. (See FIG. 10).

Each space, $S_{xy}$ (the intersection of the column headed by job x and the intersection of the column headed by job y) is empty at this stage.

In step 2, add a row entitled "period row" (or "next job list" row) in which will be listed in each space, eventually, the number, $N_A$, $N_B$, $N_C$—of the "next job list" to which the job will be assigned.

In step 3 add a column entitled "period column" for listing the number, $N_A$, $N_B$, $N_C$—of the "next job list" to which the job will be assigned.

In step 4, for each row, mark x in each space where the job heading the intersecting column must be complete before the job at the head of the row may be started.

In step 5, mark index number 1 in each space of the period row and column row of all jobs that do not require completion of any other jobs before starting the independent job.

In step 6, change each index number, $N_x$, of each job in the period row and, column until each $N_x$ is one greater than the largest N of any job listed in the row of that job as must be completed before said "each" job is started.

Any job having an index number N is assigned for execution in the list designated by N where N is the order for executing the list of jobs. Thus, the first group of jobs to be executed has an index number 1 and the last group of jobs to be executed has the greatest index number, N.

FIGS. 7 and 9 are examples where man power has been assigned according to the fractions—$M^I x_i/(\Sigma x_k)\ M^{II} x_i/(\Sigma x_k)\ M^{III} x_i/(\Sigma x_k)$ to optimize the efficiency of executing the project. The result is that all of the jobs in any one job list are all started at one time and finished at one time.

In step 3, index number 1 in each space of the period row of step 2 of all jobs that are "independent" do not require completion of any other jobs before starting the independent job.

In step 6, change each index number, $N_x$, of each job in the period row until each $N_x$ is one greater than the largest N of any job listed in the row of that job as must be completed before said "each" job is started.

Any job having an index number N is assigned for execution in the list designated by N where N is the order for executing the list of jobs. Thus, the first group of jobs to be executed has an index number 1 and the last group of jobs to be executed has the greatest index number.

FIGS. 7 and 9 are examples where man power has been assigned according to the fractions—$M^I x_i/(\Sigma x_k)\ M^{II} x_i/(\Sigma x_k)\ M^{III} x_i/(\Sigma x_k)$ to optimize the efficiency of executing the project. The result is that all of the jobs in any one job list are all started at one time and finished at one time.

In the foregoing scheduling technique, the condition has been imposed that, once the manpower has been assigned at the start of a period, then the assignment remains constant until the end of the period. in order that all jobs performed during the period start and stop at the beginning and end of the period.

This situation is not always possible. The start and finish of jobs may be delayed for any one of a number of resasons such as missed delivery schedules of essential material, weather, etc.

FIG. 10 is a flow chart of a modified method of the invention for applying the algorithm to reassigning the manpower within any joblist period in order satisfy the objective of completing the jobs assigned within the period in the shortest time.

In step 1, set a,b,c,d,—to represent the respective expenses (expressed as man-days) of jobs A, B, C, D,—which were originally scheduled to be started on day Do of a job list period. However, conditions of the project are that certain ones of these jobs, $J_1$, $J_2$, - - - $J_N$ can not be started until days $D_1$, $D_2$, - - - $D_N$ respectively.

In step 2, set M equal the total number of men available for the project.

In step 3, during period, $D_{N-1}$ to $D_N$, a number of men is assigned to each of jobs A, B, C, D—is computed successively for each period beginning with $D_0$ and continuing to $D_N$, by making successive substitutions into the equations:

$S_N = S_{N-1} - M(D_N - D_{N-1}) + j_N$ (beginning with $S_0 = a + b + c +$ which is the sum of expenses of all of the jobs started at $D_0$)

($S_N$ is the total expense required completing the jobs in progress at the beginning of period N.)

$M_N^A = Ma_N/(S_N + j_N)$ beginning with $M_0^A = Ma_0/S_0$ ($M_N^A$ is the number of men assseigned to job A at the beginning of period N $a_N = a_{N-1} - M_{N-1}^A(D_N - D_{N-1})$ (beginning with $a_0 = a$)

$a_N$ is the expense (in man days) required to finish job A at the start of period N.

As an example, consider the project having a total beginning expense a, b, c, d, - - - $J_1$ $j_2$ $j_3$ - - - $j_N$—where a, b, c, d,—are the jobs that are started at the beginning of the period on day $D_0$ and jobs $j_1$, $j_2$, - - - are the jobs that are not started until days $D_1$, $D_2$, $D_3$—respectively The object is to reassign the total men M on days $D_1$, $D_2$, $D_3$—so that the project is finished in the shortest period of time. The following steps are taken, in accordance with the invention.

Step 1: Calculate: $S_0 = a_0 + b_0 + c_0 + $ - - - (being the total sum of expense for the project during the period from $D_0$ to $D_1$.
(expenses $j_N$ of Jobs $J_N$ that haven't started at $D_0$ are omitted from $S_0$)

Step 2: Calculate $M_0^A = Ma_0/S_0$ $M_0^a = Mb_0/S_0$ etc.
(men assigned to respective jobs on day $D_0$)

Step 3. Calculate $a_1 = a_0 - M_0^A(D_1 - D_0)$ for jobs A, B, C, D, (a1, b1, c1, - - - is the remaining expense on the respective job a, b, c, - - - at $D_1$)

Step 4. In accordance with steps 1, 2, 3, calculate:

$S_1 = S_0 - M(D_1 - D_0) + j_1$ (total remaining expense of ongoing jobs at $D_1$)

then $a_1 = a_0 - M_0^A(D_1 - D_0)$, $b_1 = b_0 - M_0^B(D_1 - D_0)$ etc for c, d, and $J_1$ being the job started at $D_1$.

then $M_1^A = Ma_1/(S_1 + j_1)$ etc. and $M_1^F = Mj//(S_1 + j_1)$

Continue by computing successive values of $S_n$, $a_n$, $b_n$, $c_n$, - - - and $M_n^A$, $M^B$

------------------------

------------------------

$S_N = S_{N-1} - M(D_N - D_{N-1}) + j_N$ $a_N = a_{N-1} - M_{N-1}^A(D_N - D_{N-1})$ $M_N^A = Ma_N/(S_N + j_N)$

Continue for all values of N being the number of jobs added after each of $D_0$, $D_1$, $D_2$, - - - $D_N$ In another version of the invention, consideration is given to the situation where the number of men that can be efficiently assigned to a job is limited by the nature of the job. Any assignment of men beyond this number results in excessive expense of the project.

This situation is represented for job, J, by the graph of FIG. 11A relating number of men assigned, $M_J$, and time, (days), $T_J$, and expense, $E_J$. The graph equation is"

$$M_J T_J = E_J$$

$E_J$ is the area enclosed by the discontinuous lines and is constant for any combination of values, $M_J$, $T_J$.

FIG. 1B is a graph, $M^T T^T = E^T$ for any period of all of the jobs performed during a single period, T, where $M^T$ is a sum of all the men working on all of the jobs during the period (i.e., $M^T = \Sigma M_J$).

An anamoly occurs when:

1. The time for performing a job can not be shortened regardless of assigning additional men beyond a critical value. This would occur, for example, if there were a limited number of tools available. The result is that there is a maximum limit on the number of men that should be assigned to a job. This situation places an upper limit on the number of men that should be assigned to each of the other jobs in order that all of the jobs be started and stopped in the same period.

2. There is a lower limit to the number of men that can be practically assigned to a particular job and, therefore, there is an upper limit to the length of time that can be spent on that job. In this situation, either one of two distribution of men can be adapted in order to satisfy the requirement that all jobs in any one period be started and stopped at the same time.

One distribution is where the remaining manpower is redistributed after the particular job has been completed The redistribution is made according to the expense required to finish the jobs that have been assigned to the period.

The other distribution is where all of the manpower is assigned so that all of the jobs assigned to the period have manpower assigned so that all of the jobs are completed simultaneously with the completion of the paricular job.

The upper and lower limits of manpower imposed by conditions 1 and 2 (above) are illustrated in FIG. 11 C.

The shaded area, E', represents the additional expense that must be added to the expense, E, when an excessive number of men are added to the job.

The shaded area E" repesents the additional expense when the men, MA, assigned to job A are retained for a period $T'_A$ longer than $T_A$ actually required to complete job A.

There has been presented a description of a system for generating a schedule of a project consisting of a group of interdependent jobs and for monitoring progress on the project.

The system includes a panoramic camera for comparing images of the project to the projected schedule as a means to monitor progress. The method of constructing the schedule enables the user to plan the composition of the workforce and its period of employment thereby effecting an economy in the operation of the entire project The system has an inherent ability to adapt to unexpected contingencies.

Variations and modifications may be contemplated which are within the scope of the invention.

For example, the program may be programmed to generate an ALERT signal when estimated times of completion computed for any job differs substantially from actual completion times.

As another example, the invention may be used in educational format where images are a part of the presentation. If the instructional program is oriented to teaching an operational (medical) procedure, then each instruction, either written or displayed on the screen has a number and/or letter entered and the image has corresponding number/letters entered with the mouse and keyboard at location corresponding to the instruction In view of these and related applications, modifications and variations, it is therefore wished to define the scope of my invention by the appended claims.

We claim:

1. A system for creating a schedule for executing a project of jobs and for monitoring compliance with said schedule, wherein completion of some of said jobs depends on completion of other ones of said jobs, said system comprising:

a camera means for recording an image of a site of said jobs;

said camera means arranged for including in said image, n time stamp denoting a time when said image is recorded;

a computer means including a keyboard communicable with said camera means programmed for displaying said image on a screen of said computer means including said time stamp in a format and for displaying on said screen a total list of said jobs from said keyboard, each job denoted by an alpha-numeric character on said list;

said computer means programmed for receiving from said keyboard and displaying on said screen a series of lists of jobs, a first one of said lists including only those jobs from said total list of said jobs that are performable without any other jobs being performed beforehand and each job of said following lists of said jobs requiring performance of only those jobs that are contained in earlier ones of said lists;

said computer means programmed for receiving from said key board and displaying on said screen an estimated expense required to execute each job wherein said estimated expense is expressed as at least any one of an estimated period of time and an estimated number of man-days required to execute said each job;

said computer means programmed for generating and displaying a list of estimated start times, each estimated start time being an estimated start time for a respective job, each estimated start time being an estimated finish time of any jobs that must be finished before starting said respective job;

said computer means programmed for generating and displaying a list of estimated finish times, one finish time for each one job.

2. The system of claim 1 wherein:

said computer means is programmed for entering from said keyboard and displaying a list of resources for each said job and a time when said resources are available;

said computer means is programmed for correcting said start times of each said job for any delay in obtaining said resource.

3. The system of claim 1 wherein said computer means is programmed for:
generating and displaying a bar chart having a job coordinate orthogonal to a time coordinate in which said total list of jobs is listed on said job coordinate and time is listed on said time coordinate; and
presenting a bar on said chart for each job, parallel to said time coordinate;
each said bar having a start end with a value of time coordinate;
corresponding to a start time and a finish end with a value of time coordinate corresponding to a finish time of said each job respectively.

4. The system of claim 3 wherein said start time and finish time is at least any one of:
(i) an estimated start time and finish time;
(ii) an actual start and finish time.

5. The system of claim 4 wherein said bars generated by applying estimated start times are interleaved with said bars generated by applying actual start and finish times whereby a user is conveniently enabled to compare actual job performance to estimated job performance.

6. The system of claim 4 wherein:
said computer means is programmed for presenting a time line parallel to said job coordinate and intersecting said time coordinate at a location corresponding to said time stamp data.

7. The system of claim 1 wherein:
each list of said series of lists is designated by a superscript V where V varies from 1 up to a total number, N, of said lists, a first cr e of said lists including only those jobs from said total list of jobs that are performable without any other jobs being performed beforehand and each job of said following list of said jobs requiring performance of only those jobs that are contained in earlier ones of said lists;
said computer means programmed for receiving from said keyboard and displaying a quantity of men, $M^V$, for performing that list of jobs denoted by index, V;
said computer means programmed for receiving from said key board and displaying on said screen an estimated expense, $x^v_i$, required to execute each job in list v and designated by i, wherein said estimated expense, $x^v_i$, is expressed as man days;
said computer means programmed to display a number of men $M^V_i$, to be assigned to each job, wherein $$M^v_i = M^v x_i / \Sigma_k x^v_k$$

and $\Sigma_k x^v_k$ is the sum of all expenses for all jobs of list, V, of which $x^v_i$ is a member.

8. The system of claim 1 wherein said camera means comprises:
a panoramic camera, connected for generating on a screen of said computer,
a panoramic image of a 360° field of view around a centerline of said panoramic camera;
a directional camera connected for generating on said computer, a directional image of a location of said field of view corresponding to a direction of focus of said directional camera;
said directional camera mounted on said panoramic camera to rotate about an axis of rotation wherein said direction of focus intersects and is perpendicular to said axis of rotation and said axis of rotation and is coincident to said centerline;
a motor coupled to said directional camera for rotating said direction of focus of said directional camera to a selected direction;
said computer means programmed for enabling movement of a cursor to a location of interest on said panoramic image, and energizing said motor to rotate said directional camera to where said direction of focus corresponds to said location of interest.

* * * * *